United States Patent [19]
Lamoureux
[11] 3,879,636
[45] Apr. 22, 1975

[54] CIRCUIT ARRANGEMENT FOR CORRECTING HORIZONTAL PIN CUSHION DISTORTION

[75] Inventor: Andre Lamoureux, Paris, France
[73] Assignee: Thomson-CSF, Paris, France

[22] Filed: Dec. 7, 1973
[21] Appl. No.: 422,974

[30] Foreign Application Priority Data
Dec. 8, 1972 France ............................ 72.43743

[52] U.S. Cl. ............................................ 315/371
[51] Int. Cl. ............................................ H01j 21/56
[58] Field of Search .... 315/276 D, 27 R, 24, 27 TD

[56] References Cited
UNITED STATES PATENTS

| | | | |
|---|---|---|---|
| 3,748,531 | 7/1973 | Bockhorst et al. | 315/276 D |
| 3,803,447 | 4/1974 | Wolber | 315/27 SR |

*Primary Examiner*—Maynard R. Wilbur
*Assistant Examiner*—J. M. Potenza
*Attorney, Agent, or Firm*—Edwin E. Greigg

[57] ABSTRACT

A circuit arrangement for the correction of horizontal pin cushion distortion in a television receiver includes a main sweep generator having a final stage which feeds the primary winding of a line transformer. The primary winding is connected in series with a capacitor whose one terminal is connected to ground. The final stage includes a switching circuit composed of two circuit components connected in parallel with one another and in series with the primary winding and the capacitor. The switching circuit is open during intervals of the return of the line sweep and closed during the forward line sweep. An auxiliary generator includes a modulator which furnishes a modulated correction voltage at one terminal of a second capacitor. A compensation coil and the horizontal deflection coil are both connected together between the main sweep generator and the auxiliary generator. Correction voltage is applied to the deflection coil and to the compensation coil via an auxiliary transformer whose primary winding is connected, at one end, to the second capacitor and, at its other end, to a parallel network of a first diode and a third capacitor, the first diode making it possible, during forward sweeps, to allow current to flow through the primary winding in one direction. The other end of the primary winding is also operatively connected, via a second diode, which is poled oppositely to the first diode, to the final stage of the main sweep generator in such a manner that current of the primary winding may flow through the final stage during forward sweeps. The parameters of the circuit arrangement are such that the two diodes are non-conducting during return intervals of the line sweep.

10 Claims, 3 Drawing Figures

CIRCUIT ARRANGEMENT FOR CORRECTING HORIZONTAL PIN CUSHION DISTORTION

BACKGROUND OF THE INVENTION

This invention relates to a circuit arrangement for correcting horizontal pin cushion distortion in television receivers and the like.

The present invention relates, more particularly to an improvement in a circuit arragement for correcting horizontal pin cushion distortion in television receivers and the like which circuit arrangement includes an auxiliary line sweep generator which does not influence the current furnished by the main line sweep generator.

It is known to avoid such an influence (which would entail a modulation of the high voltage at the field frequency; such modulation would have well-known undesirable effects) by providing a circuit arrangement which includes a deflection coil on the one hand, and a compensation coil on the other hand, both having the same inducton L interposed or connected between the principal sweep generator furnishing a voltage $V$ at the line sweep frequency and the auxiliary sweep generator furnishing a correction voltage $v$, modulated at field frequency. In such an arrangement, the deflection coil is subjected to the voltage $V$ plus the voltage $v$ and the compensation coil is subjected to a voltage which is a function of the voltage $V$ and of the voltage $v$ such that the main sweep generator supplies a current which is independent of the voltage $v$.

In a known circuit arrangement designed as suggested above, the auxiliary generator is an apparatus which effects the parallel connection of a transistor, a diode and a capacitor between the source of the correction voltage and the output of the auxiliary generator. During the forward sweep, the correction voltage is furnished at the output of the auxiliary generator either by the emitter-to-collector voltage of the transistor, or by the diode. The transistor is made conductive during the forward sweep duration by action of a passive network supplied from a secondary winding of the line sweep transformer, the passive network being connected between the base and the emitter of the transistor.

During the return sweep, the transistor and the diode act as an open switch; whereas, the capacitor, in effect, closes the circuit traversed by the sweep current during the return sweep interval in a known fashion.

The above mentioned capacitor furthermore determines the duration of the return sweep.

This known circuit arrangement, which from many points of view is very interesting, nevertheless has a number of disadvantages.

Firstly, in the case of a line deflector of the toroidal type for a conventional color receiving tube having a 100° deflection, the energy is very high and the impedance is low. The transistor, in the known circuit arrangement, must function at heavy current and low voltage, which requires for the production of the correction voltage a modulator which functions at very low voltage and at very high current. In the practical case, of a transistorized modulator, the readily available commercial transistors do not lend themselves very well for this purpose.

Secondly, the passive network required to control the transistor base, in the known circuit arrangement, is both complex and costly. The evacuation of carriers in the transistor base poses serious problems. The duration of the auxiliary return sweep begins later than that of the main sweep and the efficiency of the former becomes worse than the efficiency of the latter (a shorter return period).

SUMMARY OF THE INVENTION

It is an object of the present invention to provide, in a circuit arrangement for correcting horizonal pin cushion distortion, an improvement which avoids the need for a modulator which functions at very low voltage and very high current.

It is another object of the present invention to provide an improvement in a circuit arrangement for correcting horizontal pin cushion distortion which can include a transistorized modulator using a readily available, commercial transistor.

It is a further object of the present invention to provide an improvement in a circuit arrangement for correcting horizontal pin cushion distortion which can use a relatively simple and inexpensive passive network to control the base of a transistor of a modulator forming part of the circuit arrangement.

It is an additional object of the present invention to provide an improvement in a circuit arrangement for correcting horizontal pin cushion distortion which allows carriers in the base of a transistor forming part of a modulator to be readily evacuated The foregoing objects, as well as the others which are to become clear from the text below, are achieved in accordance with the present invention by providing an improvement in a circuit arrangement for correcting horizontal pin cushion distortion, which circuit arrangement includes a main sweep generator having a final stage which feeds the primary winding of a line sweep transformer. The primary winding is connected in series with a capacitor having one terminal connected to ground. The final stage includes a switching circuit composed of two circuit components connected in parallel with one another and in series with the primary winding and the capacitor. The switching circuit is open during intervals of the return of the line sweep and closed during the forward line sweep. An auxiliary generator includes a modulator which furnishes a modulated correction voltage at one terminal of a second capacitor. A compensation coil and the horizontal deflection coil are both connected together between the main sweep generator and the auxiliary generator. Correction voltage is applied to the deflection coil and to the compensation coil via an auxiliary transformer whose primary winding is connected, at one end, to the second capacitor and, at its other end, to a parallel network of a first diode and a third capacitor, the first diode making it possible, during forward sweeps, to allow current to flow through the primary winding in one direction. The other end of the primary winding is also operatively connected, via a second diode, which is poled oppositely to the first diode, to the final stage of the main sweep generator in such a manner that current of the primary winding may flow through the final stage during forward sweeps. The parameters of the circuit arrangement are such that the two diodes are nonconducting during return intervals of the line sweep.

The present invention makes it possible to use a small coupling transformer between the modulator and the output of the auxiliary sweep generator, this modification of the coupling permits modifying the switch in the auxiliary sweep circuit in an advantageous fashion.

DESCRIPTION OF THE PREFERRED EMBODIMENTS

Figure 1:
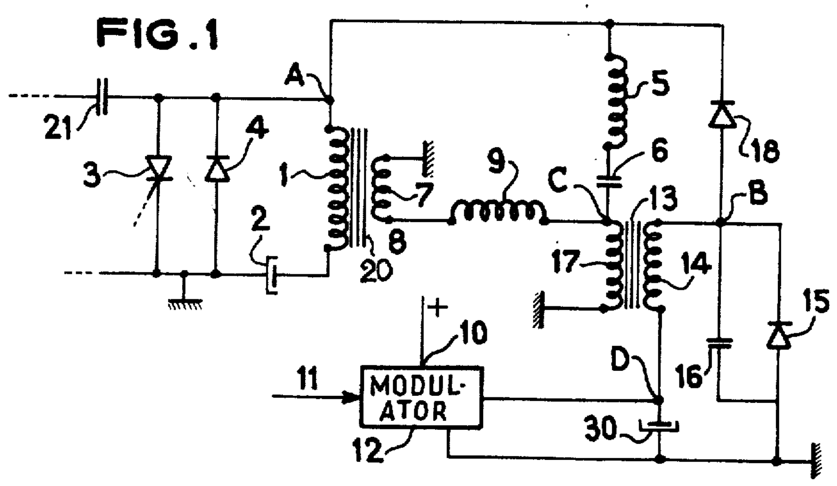
FIG. 1 is a schematic diagram of a circuit arrangement for the correction of horizontal pin cushion incorporating an improvement according to one embodiment of the present invention.

Referring now to FIG. 1, the circuit arrangement for correcting horizontal pin cushion distortion includes a main line sweep generator in a television receiver, only the principal circuit components of the main line sweep generator, which are necessary for the comprehension of the present invention being shown. The main line sweep generator may be of conventional known construction, such as the generator using thyristor disclosed in French Pat. No. 1,536,025.

As illustrated in FIG. 1, the circuit includes a line sweep transformer 20 having a primary winding 1 having a first terminal A, its other terminal being connected to circuit ground via a capacitor 2. The terminal A is connected to one plate of a capacitor 21. Between the terminal A and the circuit ground are connected, in parallel, a thyristor 3 and a diode 4. The thyristor 3 and the diode 4 are oppositely poled.

The circuit ground, a second plate of the capacitor 21 and the gate electrode of the thyristor 3 are all connected to other circuit components (not shown) of the conventional, main line sweep generator.

The thyristor 3 and the diode 4 constitute respective paths between the terminal A and the circuit ground. The terminal A is also connected to ground via the primary winding 1 and the capacitor 2. Whether the thyristor 3 or the diode 4 is conducting depends on the polarity of current during the forward sweep.

The combination of the thyristor 3 and the diode 4 constitutes a switch which is open during the return sweep. The circuit path formed by circuit ground, the capacitor 2, the primary winding 1 and the terminal A back to circuit ground is closed between the terminal A and the circuit ground by means of conventional circuit components, not shown for the sake of succinctness and clarity, forming part of main line sweep generator. The main line sweep generator can be of another type provided that it performs a switching function which plays the same role as the combination of the thyristor 3 and the diode 4, this being almost always the case.

A deflection coil 5 is connected to the terminal A and to a first terminal of a capacitor 6. The other terminal of the capacitor 6 is connected to an output terminal C of an auxiliary sweep generator which is to be described in detail below.

A secondary winding 7 of the line transformer 20, which accomplishes an inversion of the signal with respect to the primary winding, has one of its two terminals connected to circuit ground and at its other terminal 8 to one terminal of a compensation inductor 9. The second terminal of the compensation inductor 9 is connected to the terminal C.

A modulator 12 has a positive voltage applied to its input terminal 10 and at its modulation input terminal 11 it receives a signal at the field frequency. The output voltage of the modulator 12, appearing between its output and circuit ground is applied to a terminal D of a capacitor 30 whose other terminal is connected to circuit ground.

The circuit of FIG. 1, as described thus far, conforms to the known state of the art. The present invention resides in the way that the voltage at the point or terminal D is transmitted to the terminal C during forward sweeps, and also in the way the signal for the return sweep is to be obtained at the same terminal C.

For this purpose, a small transformer 13 is used whose primary winding 14 is connected, at one end, to the terminal D and, at its other terminal B, to the cathode of a diode 15 whose anode is connected to circuit ground and also to one terminal of a capacitor 16, whose other terminal is also connected to circuit ground.

Further connected to the terminal B is the anode of a didoe 18 whose cathode is connected to the point or terminal A.

The secondary winding 17 of the small transformer 13 is connected between circuit ground and the point or terminal C.

In this circuit arrangement, which makes use of the fact that, during forward sweeps, the switching circuit formed by the thyristor 3 and the diode 4 of the main line sweep generator is closed, the correction current due to the voltage appearing at the point or terminal D, is furnished to winding 5 and the inductor 9 by the small transformer 13. The current in the primary winding 14 of transformer 13, when positive, flows through a diode 18 and through the switch circuit of the main sweep generator or, more precisely, through the thyristor 3. When the current is negative, it flows through the diode 15.

The voltage ratio *r* of the small transformer 13 is negative and its value is chosen, on the one hand, to be sufficiently low so that the positive pulse for the line sweep return appearing at the terminal B in the auxiliary sweep circuit be at all times lower than the positive line sweep return pulse appearing at the terminal A in the main sweep generator circuit, in such a way that the diode 18 remains blocked during the return sweep interval. This assures that the switch of the auxiliary sweep circuit remains open during the return sweep. During that return interval, the primary winding of the transformer 13 is isolated in the closed circuit loop connected to circuit ground and containing, beside the primary winding 14, the capacitors 16 and 30. This permits the creation of a resonant return signal analogous to what occurs in the main sweep generator circuit. On the other hand, the ratio *r* is chosen sufficiently large so that the modulator, which preferably is transistorized, can function at an impedance level which is compatible with readily available commercial transistors. Such a choice is possible over a fairly large range of values and one keeps this in mind when choosing the level of the signal to be furnished by the modulator. The improved circuit arrangement thus far described and shown in FIG. 1 avoids the disadvantages mentioned above which exist in the prior art, if one notices that, besides the impedance matching of the modulator, that the diode 18 is very quickly blocked, as compared with a transistor; this permits one practically to obtain coincidence between the two return times of the two sweep circuits.

One should notice, however, in this arrangement that the correction current during forward sweeps, flow through the thyristor 3 in one polarity and through the diode 4 in the reverse case. The fact that in the first case it passes though the thyristor 3 but does not pass through diode 4 in the second case changes the mean value of the current flowing in the switching circuit formed by the thyristor 3 and the diode 4, this reduces the recovery time of the sweep circuit. This "recovery time" of the sweep circuit is defined as the time interval prior to the return of the line sweep, during which the diode 4 is conducting.

In order to avoid this inconvenience, one could use a variation of the circuit of FIG. 1 in the case where the main sweep generator already includes a rectifier circuit which permits increasing the recovery time of the sweep circuit without noticeable energy losses.

It is to be remembered that, as in conventional thyristor-type sweep generators generally, the preparation of the return of the line sweep initiates, at the end of the forward sweep, one half cycle of a resonance current. In the present case, such a resonant current flows in the thyristor 3 in the inverse sense to the current coming from the capacitor 2, thereby in effect extinguishing the thyristor 4 when these two currents are substantially first equal. Between this instant and the instant when the resonance current after having passed through its maximum again becomes equal to the current coming from the capacitor 2, the excess of the resonance current over the other current mentioned passes through the diode 4. The time interval during which the diode 4 conducts is the recovery time of the sweep circuit. This recovery time must be higher than that of the thyristor 3 in order to avoid an untimely extinguishing of the latter, which poses certain problems. A solution has been proposed which involves means permitting a strong supplementary current to flow in the switching circuits constituted by the thyristor 3 and the diode 4, in the direction of conduction of the diode 4. A preferred embodiment has been proposed where the main sweep circuit has a line sweep transformer, that embodiment permits recovering the energy expended for the above indicated effect.

This proposed technique can easily be transposed to the case where the deflection coil is connected by parallel with the primary winding of the line transformer.

Figure 2:
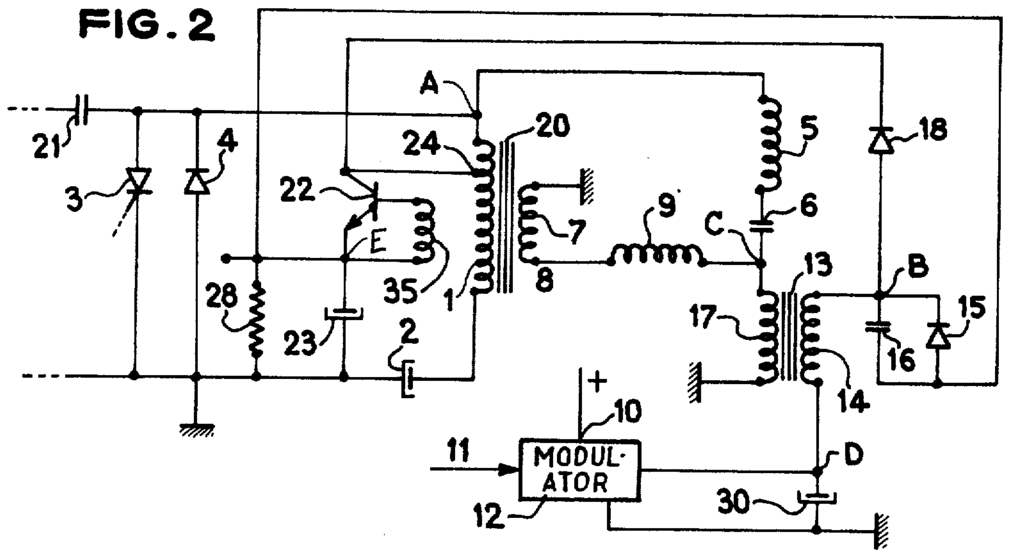
FIG. 2 is a schematic diagram of a circuit arrangement for the correction of horizontal pin cushion incorporating an improvement according to a second embodiment of the present invention.

It leads one to insert, as shown in FIG. 2, the collector-emitter branch of a power transistor 22, in series with a parallel connected capacitor 23, of high value, and a dissipative load, shown as a resistor 28, between an intermediate tap 24 of the primary winding 1 and circuit ground, where the base electrode of the transistor 22 is unblocked during the forward sweep.

The voltage appearing at the intermediate tap 24 and transmitted during the unblocking of the transistor 22 to an ungrounded terminal of the capacitor 23 is integrated therein for use in the load. It is, for example, possible to determine the parameters in such a way as to obtain, between the two terminals of the capacitor 23, a direct D.C. voltage of 24 volts which provides a current of 2 amperes, for example, to the field sweep circuits of a television receiver using the circuit shown in FIG. 2.

Furthermore, when the transistor 22 conducts the direct current flowing permanently through the load resistor 28, returns through the diode 4 and through that portion of the primary winding 1 lying between the terminal A and the tap 24, which leads to the desired result of increasing the recovery time of sweep circuit. Under there conditions, the circuit arrangement for the correction of the horizontal distortion is modified, in comparison to the arrangement of FIG. 1, as set out below. The diode 15 and the capacitor 16 are no longer connected to circuit ground, as in the circuit of FIG. 1, but to one terminal E of the capacitor 23, the primary winding 14 of the transformer 13 is then supplied by the difference voltage existing between the points or terminals D and E when the diode 15 conducts, that is to say, between the voltage across the terminals of the capacitor 30 and the voltage which exists at the terminal E of the capacitor 23. Furthermore, the cathode of the diode 18 is no longer connected to the terminal A but to the tap 24.

Because of this, the current flowing in the primary winding 14 of the transformer 13 returns through the diode 18, the transistor 22 and the capacitor 23 when it flows in one sense and through the diode 15 and the capacitor 23 when it flows in the opposite sense. Its flow, therefore, does not change the mean value of the current in the switching circuit, constituted by the thyristor 3 and the diode 4, and therefore, also does not change the recovery time of the sweep circuit.

In the case considered, it can be noted that the power transistor 22 is necessary, in any case, and that its placement and its control are such that it does not produce the disadvantages of the prior art mentioned above under the summary of the invention part of this specification.

Figure 3:
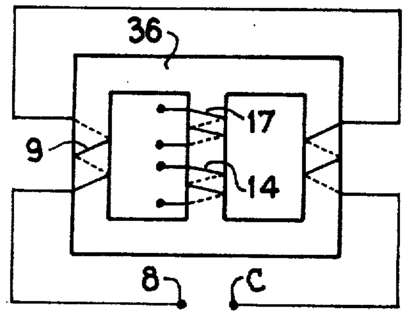
FIG. 3 is a schematic diagram of a variant of a detail of the circuits shown in FIGS. 1 and 2, which variant can be incorporated into either of these circuits to form respectively third and fourth improved circuit arrangements according to the present invention.

Of course, the invention is not limited to the embodiments thus far described and illustrated. An interesting variant of the circuit arrangements of FIGS. 1 and 2 permits the compensation at a different impedance level by adding a third winding to the auxiliary transformer. In these variants, the compensation inductor 9 is connected on an already existing tap of the line sweep transformer and its other side is no longer connected to the point C, but to the end of the third winding. The third winding can be a part of the secondary winding of the transformer and the compensation inductor 9 is then connected to an intermediate tap of the secondary winding. Furthermore, economy may be achieved in the circuit arrangement of FIG. 1 or of its variation shown in FIG. 2 or in the variations just mentioned, by placing the compensating inductor 9 on the same core as the small transformer 13. In fact, the primary and secondary windings of the transformer are then wound on the central leg of its core 36 (FIG. 3). The terminals of the compensation inductor 9 are those also shown in FIGS. 1 and 2. The compensation inductor 9 is thus completely independent of the other two windings provided that it is wound on the two outside legs of the core 36. Furthermore, the small current flowing through it does not pose heating problems, and therefore there is no need to increase the cross section of the transformer.

It is to be appreciated that correction voltages of relatively different levels can be applied to the deflection winding 5 and to the compensation inductor 9 from the transformer 13 by providing for either a tap on the secondary winding 17 or use of two separate secondary windings having different turn ratios.

It is to be appreciated that the foregoing description and illustrations are not limiting. Numerous variants and different embodiments are possible and are contemplated within the spirit of the invention, the scope being determined by the appended claims.

What is claimed is:

1. In a circuit arrangement for correcting horizontal pin cushion distortion of a television receiver or the like, which circuit arrangement includes: (1) a main sweep generator having a final stage which feeds a primary winding of a line sweep transformer, the primary winding being connected in series with a first capacitor whose one terminal is connected to circuit ground, the final stage being provided with a switching circuit means which includes two circuit components connected in parallel with one another and in series with the primary winding and the first capacitor, and the switching circuit means being open during intervals of return of line sweep and closed during forward line sweep; (2) an auxiliary sweep generator including a modulator, which furnishes a modulated correction voltage at a terminal of a second capacitor; (3) a compensation inductor; and (4) a horizontal deflection winding, the inductor and the horizontal deflection winding being connected together between the main sweep generator and the auxiliary sweep generator, the improvement comprising: a second capacitor; a third capacitor; a first diode; a second diode; and an auxiliary transformer having a primary winding and at least one secondary winding for applying a correction voltage from said modulator to said horizontal deflection winding and to said compensation inductor, said primary winding being connected from one of its terminals to said second capacitor and having its second terminal connected to a parallel network composed of said third capacitor and said first diode, which allows current to flow through said primary winding during forward sweeps in one direction, said second terminal of said primary winding also being connected via said second diode, which is opppositely poled with respect to said first diode, to said final stage of said main sweep generator, said second diode allowing current to flow through said primary winding and said final stage in a direction opposite to said one direction, and said first and second diodes both being non-conducting during return intervals of line sweep.

2. An improved circuit arrangement according to claim 1, wherein one of said two circuit components of said switching circuit means is conductively in circuit with said primary winding when current flows therein in said direction opposite to said one direction, and said third capacitor and said first diode are connected to circuit ground from said second terminal of said primary winding.

3. An improved circuit arrangement according to claim 1, wherein said primary winding and said secondary winding of said auxiliary transformer are wound on a central leg of a transformer core, said compensation inductor being wound on outside legs of said transformer core.

4. An improved circuit arrangement according to claim 1, including a transistor, a dissipative load and a fourth capacitor, and wherein said two circuit components of said switching circuit means include a thyristor and a third diode, said main sweep generator includes (1) means for increasing recovery time of the sweep circuit which means comprises a connection between an intermediate tap on said primary winding of said line sweep transformer, (2) a series circuit constituted by said transistor in series with said fourth capacitor which has said dissipative load connected in parallel therewith, and (3) means for assuring unblocking of said transistor during forward sweep, said second diode being connected to said intermediate tap to assure, during forward sweep, current flowing in said direction opposite said one direction, said primary winding of said auxiliary transformer can flow through said transistor and through the parallel circuit constituted by said fourth capacitor and said dissipative load, and said parallel network constituted by said first diode and said third capacitor is connected to circuit ground via the parallel connected said fourth capacitor and said dissipative load.

5. An improved circuit arrangement according to claim 4, wherein said primary winding and said secondary winding of said auxiliary transformer are wound on a control leg of a transformer core, said compensation inductor being wound on outside legs of said transformer core.

6. An improved circuit arrangement according to claim 1, wherein said auxiliary transformer applies correction voltages of substantial identical level to both said deflection winding and said compensation inductor.

7. An improved circuit arrangement according to claim 1, wherein said auxiliary transformer applies correction voltages of relatively different levels to said deflection winding and to said compensation inductor.

8. An improved circuit arrangement according to claim 7, wherein said secondary winding of said auxiliary winding is provided with an intermediate tap.

9. An improved circuit arrangement according to claim 7, wherein said at least one secondary winding includes two secondary windings giving respectively different turn ratios.

10. An improved circuit arrangement according to claim 1, including further circuit components of a complete television receiver.

* * * * *